(12) United States Patent
Lipsky et al.

(10) Patent No.: US 9,214,037 B2
(45) Date of Patent: Dec. 15, 2015

(54) METHOD AND SYSTEM FOR DISTRIBUTING IMAGES TO CLIENT SYSTEMS

(75) Inventors: Scott E. Lipsky, Seattle, WA (US); Paul Brownlow, Seattle, WA (US)

(73) Assignee: OL Security Limited Liability Company, Dover, DE (US)

( * ) Notice: Subject to any disclaimer, the term of this patent is extended or adjusted under 35 U.S.C. 154(b) by 3521 days.

(21) Appl. No.: 10/702,105

(22) Filed: Nov. 5, 2003

(65) Prior Publication Data

US 2005/0071867 A1  Mar. 31, 2005

Related U.S. Application Data

(63) Continuation of application No. 10/675,925, filed on Sep. 29, 2003, now Pat. No. 8,949,380.

(51) Int. Cl.
| | |
|---|---|
| *G06F 15/16* | (2006.01) |
| *G06T 13/80* | (2011.01) |
| *G06F 3/0481* | (2013.01) |
| *G11B 27/034* | (2006.01) |
| *G11B 27/32* | (2006.01) |

(52) U.S. Cl.
CPC .............. *G06T 13/80* (2013.01); *G06F 3/0481* (2013.01); *G11B 27/034* (2013.01); *G11B 27/329* (2013.01); *G06F 2203/04806* (2013.01)

(58) Field of Classification Search
USPC .................................................. 709/223, 220
See application file for complete search history.

(56) References Cited

U.S. PATENT DOCUMENTS

| | | | | |
|---|---|---|---|---|
| 5,712,961 | A * | 1/1998 | Matsuo ........................ | 700/258 |
| 5,781,716 | A | 7/1998 | Hemphill et al. | |
| 5,806,005 | A * | 9/1998 | Hull .................... | H04N 1/00212 |
| | | | | 348/14.12 |
| 5,867,729 | A | 2/1999 | Swonk | |
| 6,370,656 | B1 * | 4/2002 | Olarig et al. ..................... | 714/23 |
| 6,442,573 | B1 * | 8/2002 | Schiller et al. ................ | 715/210 |
| 6,617,879 | B1 | 9/2003 | Chung | |
| 6,745,242 | B1 * | 6/2004 | Schick et al. ................. | 709/224 |
| 6,854,010 | B1 | 2/2005 | Christian et al. | |
| 6,873,988 | B2 | 3/2005 | Herrmann et al. | |
| 7,007,047 | B2 | 2/2006 | Zelenka et al. | |
| 7,047,551 | B2 * | 5/2006 | Ogawa ................... | G06Q 30/02 |
| | | | | 348/E7.063 |
| 7,082,130 | B2 * | 7/2006 | Borella ............... | H04L 12/5602 |
| | | | | 370/219 |

(Continued)

OTHER PUBLICATIONS

United States Patent and Trademark Office, Restriction Requirement, U.S. Appl. No. 12/858,368, mailed Feb. 27, 2013, 7 pages.

(Continued)

*Primary Examiner* — Tammy Nguyen
(74) *Attorney, Agent, or Firm* — Perkins Coie LLP (57) ABSTRACT

A method and system for distributing images for display by client systems. A distribution system includes an image server system that is connected to image client systems via a communications link, such as the Internet. The image server system is responsible for providing image packages to the image client systems and for collecting information from the image client systems. Each image client system periodically sends a heartbeat communication to the image server system. Upon receiving a heartbeat communication, the image server system determines the state of the image client system that sent the heartbeat communication and responds appropriately. The response may include instructions for the image client system to retrieve new images, to retrieve software updates, to send usage data, and so on.

40 Claims, 6 Drawing Sheets

(56) References Cited

U.S. PATENT DOCUMENTS

| | | | |
|---|---|---|---|
| 7,146,541 B2* | 12/2006 | Blumberg | G06F 11/0793 714/38.14 |
| RE39,526 E * | 3/2007 | Hull et al. | 455/566 |
| 7,213,246 B1 | 5/2007 | van Rietschote et al. | |
| 7,242,421 B2* | 7/2007 | Center, Jr. | H04N 21/44218 348/14.1 |
| 7,244,230 B2* | 7/2007 | Duggirala | A61B 8/00 128/925 |
| 7,295,511 B2* | 11/2007 | Sharma et al. | 370/217 |
| 7,308,487 B1 | 12/2007 | Dansie et al. | |
| 7,620,701 B2* | 11/2009 | Niimura | 709/219 |
| 7,779,090 B2* | 8/2010 | Lipsky et al. | 709/220 |
| 7,937,470 B2* | 5/2011 | Curley et al. | 709/226 |
| 2002/0013897 A1 | 1/2002 | McTernan et al. | |
| 2002/0056123 A1 | 5/2002 | Liwerant et al. | |
| 2002/0152432 A1 | 10/2002 | Fleming | |
| 2002/0163672 A1* | 11/2002 | Yoshida et al. | 358/400 |
| 2003/0023846 A1 | 1/2003 | Krishna et al. | |
| 2003/0069962 A1 | 4/2003 | Pandya | |
| 2003/0110503 A1* | 6/2003 | Perkes | 725/86 |
| 2003/0191805 A1 | 10/2003 | Seymour et al. | |
| 2004/0015554 A1 | 1/2004 | Wilson | |
| 2004/0152451 A1* | 8/2004 | Park | 455/412.1 |
| 2005/0071880 A1 | 3/2005 | Lipsky et al. | |
| 2005/0086357 A1 | 4/2005 | Lipsky et al. | |
| 2007/0036086 A1 | 2/2007 | Walter et al. | |
| 2007/0229652 A1* | 10/2007 | Center et al. | 348/14.08 |
| 2010/0312819 A1 | 12/2010 | Lipsky et al. | |

OTHER PUBLICATIONS

United States Patent and Trademark Office, Notice of Allowance, U.S. Appl. No. 12/858,368, mailed Jul. 1, 2013, 29 pages.
United States Patent and Trademark Office, Non-Final Office Action, U.S. Appl. No. 10/675,925, mailed Oct. 17, 2007, 23 pages.
United States Patent and Trademark Office, Non-Final Office Action, U.S. Appl. No. 10/675,925, mailed May 30, 2008, 24 pages.
United States Patent and Trademark Office, Final Office Action, U.S. Appl. No. 10/675,925, mailed Feb. 19, 2009, 26 pages.
United States Patent and Trademark Office, Advisory Action, U.S. Appl. No. 10/675,925, mailed Apr. 22, 2009, 3 pages.
United States Patent and Trademark Office, Non-Final Office Action, U.S. Appl. No. 10/675,925, mailed May 27, 2009, 26 pages.
United States Patent and Trademark Office, Final Office Action, U.S. Appl. No. 10/675,925, mailed Feb. 5, 2010, 25 pages.
United States Patent and Trademark Office, Advisory Action, U.S. Appl. No. 10/675,925, mailed Apr. 14, 2010, 4 pages.
United States Patent and Trademark Office, Examiner's Answer to Appeal Brief, U.S. Appl. No. 10/675,925, mailed Oct. 7, 2010, 26 pages.
United States Patent and Trademark Office, Patent Board Decision, U.S. Appl. No. 10/675,925, mailed Oct. 22, 2013, 7 pages.
United States Patent and Trademark Office, Notice of Allowance, U.S. Appl. No. 10/675,925, mailed Feb. 7, 2014, 6 pages.
United States Patent and Trademark Office, Notice of Allowance, U.S. Appl. No. 10/675,925, mailed Aug. 4, 2014, 8 pages.
United States Patent and Trademark Office, Non-Final Office Action, U.S. Appl. No. 10/702,106, mailed Aug. 5, 2008, 12 pages.
United States Patent and Trademark Office, Final Office Action, U.S. Appl. No. 10/702,106, mailed Mar. 24, 2009, 13 pages.
United States Patent and Trademark Office, Advisory Action, U.S. Appl. No. 10/702,106, mailed Jun. 3, 2009, 3 pages.
United States Patent and Trademark Office, Non-Final Office Action, U.S. Appl. No. 10/702,106, mailed Jul. 8, 2009, 13 pages.
United States Patent and Trademark Office, Restriction Requirement, U.S. Appl. No. 10/702,106, mailed Mar. 9, 2010, 5 pages.
United States Patent and Trademark Office, Notice of Allowance, U.S. Appl. No. 10/702,106, mailed Apr. 16, 2010, 5 pages.

* cited by examiner

METHOD AND SYSTEM FOR DISTRIBUTING IMAGES TO CLIENT SYSTEMS

CROSS-REFERENCE TO RELATED APPLICATION

This is a continuation of and claims priority to U.S. patent application Ser. No. 10/675,925 (U.S. Pat. No. 8,949,380), filed on Sep. 29, 2003, and which is hereby incorporated herein by reference in its entirety.

TECHNICAL FIELD

The described technology relates generally to the distribution of content and particularly to the distribution of images to client systems.

BACKGROUND

The displaying of paintings, sketches, photograph, and other images is very popular in business and personal settings. For example, most homes and offices have paintings or photographs on their walls. It can be very expensive, however, to purchase, maintain, and display high-quality paintings—so much so that most businesses and families cannot afford to do so. As a result, most images that are displayed are low-cost reproductions of high-quality images or originals of low-quality paintings. Because viewers can tire of seeing the same painting on a daily basis, some businesses change the location of the paintings that they display to provide more variety to their customers and employees.

Various electronic means have been used to display image to help reduce the cost of displaying images and increase the variety of images that are displayed. For example, slide programs for general-purpose computers have been developed to display images (e.g., stored in JPEG format) on display device such as a computer monitor. These slide shows typically cycle through displaying a set of images (e.g., defined by a display list) at a fixed rate. Some electronic frames have been developed that allow a user to upload their own photographs for display on a screen within the frame. These electronic frames can, much like a slide show program, cycle through displaying a set of photographs. It can be a time-consuming process, however, to change the set of images that are displayed either by a slide show program or an electronic picture frame. To change a set of images, a person may to search for, pay for, and download an electronic version of an image and create a display list that includes that image.

These current means for displaying images have disadvantages that relate primarily to variety and quality of the images that can be displayed in a cost-effective manner. It would be desirable to have a system that would allow for the electronic display of a wide variety of high-quality images in way that requires very little user interaction and is cost effective.

DETAILED DESCRIPTION

A method and system for distributing images for display by client systems is provided. In one embodiment, a distribution system includes an image server system that is connected to image client systems via a communications link, such as the Internet. Each image client system is connected to a display device (e.g., high-resolution, flat-panel monitor) and includes an image store and a display component. The display component periodically retrieves images from the image store and displays those images on the display device. The image server system is responsible for providing image packages to the image client systems and for collecting information (e.g., usage data) from the image client systems. Each image client system periodically sends a heartbeat communication to the image server system. Upon receiving a heartbeat communication, the image server system determines the state of the image client system that sent the heartbeat communication and responds appropriately. The response may include instructions for the image client system to retrieve new images, to retrieve software updates, to send usage data, and so on. If the response includes instructions to retrieve images, then the image client system sends a heartbeat communication to the image server system requesting the retrieval of images. If the response includes instructions to send usage information, then the image client system collects the information and sends it to the image server system via a heartbeat communication. If the response includes instructions to retrieve software updates, then the image client system sends a heartbeat communication to the image server system requesting the software updates. The image server system and each image client system communicate via sessions that includes multiple heartbeat communications sent by the client system and responses sent by the server system. In a response to a heartbeat communication, the image server system may direct an image client system to communicate with another server at a designated address to, for example, send usage data for storage by the server. The image client systems may periodically send heartbeat communications so that the image server system can provide instructions to the image client systems. In this way, the image server system can provide updated image information to the image client systems via the Internet and in real time.

In one embodiment, the distribution system distributes image packages via either an electronic means (e.g., via the Internet) or a physical means (e.g., via a CD-ROM) depending on whether a client system has recently communicated electronically with the server system. The server system tracks the heartbeat communications received from each client system. When the server system is a ready to distribute image packages (or software updates) to a client system, the server system determines whether the client system has recently communicated electronically with the server system via a communications link. If so, the server system attempts to send the image package to the client system via the communications link, for example, when the next heartbeat communication is received from the client system. Upon receiving the image package, the client system can update its image store so that it can start displaying the images included in the package. If the client system has not recently communicated electronically with the server system, then the server system stores the image package on a physical computer-readable medium, such as a DVD or CD-ROM. The server system then directs the delivery of the computer-readable medium via conventional means, such as the Postal Service, to the customer who controls the client system. The customer, upon receiving the computer-readable media, can then install the image package on the client system. In this way, the distribution system can automatically determine whether image packages or other packages are to be delivered via a communications link or via a physical medium.

In one embodiment, the distribution system employs various techniques to ensure the security and integrity of the distribution of the images. The distribution system may encrypt each image package before it is distributed to a client system. The distribution may assign a public and private key pair to each client system and encrypt the image packages using the public key for a client system. The distribution system may also digitally sign the image packages using a private key of the distribution system. When a client system receives an image package sent electronically or via a physical medium, the client system can decrypt the image package using its private key and check the digital signature using the public key of the distribution server. Thus, encryption and signing of the image packages can help ensure that the images even if intercepted cannot be used in an unauthorized manner and that an unauthorized server cannot impersonate the distribution system. The distribution system can use various recovery techniques to ensure the proper and timely transmission of data between the server system and the client system. For example, the server system can send an image package to a client system via a session comprising a series of responses to heartbeat communications. If the session is interrupted (e.g., because the client system went offline), then the transmission of the image package can be resumed when the client system comes online. The server system can also control the rate at which the client systems communicate with the server system. For example, the server system may spread out the informing of client systems that image packages are ready to be retrieved so that the server system is not inundated with request to retrieve at the same time. Also, the server system may notify the client system to change their heartbeat delay for the next heartbeat communications or for all future heartbeat communications. Thus, the server system may use various throttling techniques to control communications with the client systems.

Figure 1:
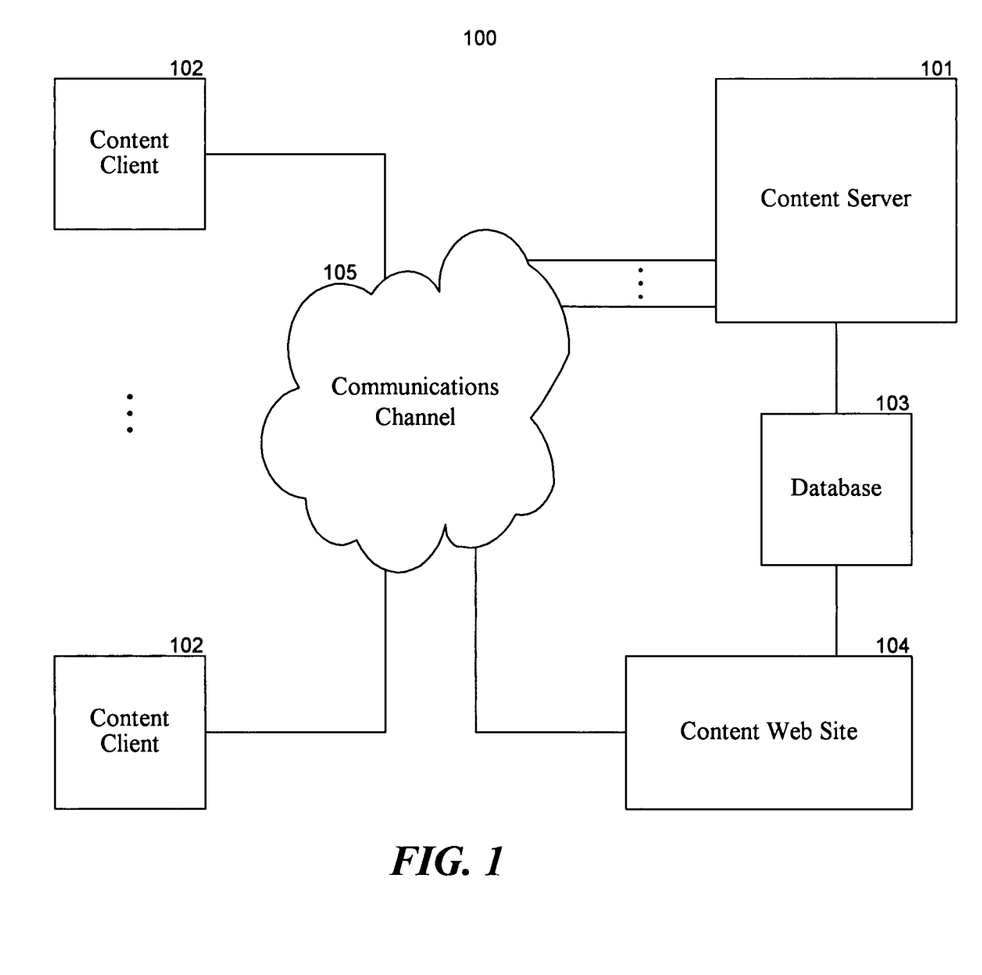
FIG. 1 is a block diagram illustrating components of the distribution system in one embodiment.

FIG. 1 is a block diagram illustrating components of the distribution system in one embodiment. The distribution system includes a server system 101 connected to client systems 102 via a communications link 105, such as the Internet. The server system maintains a database of information 103 containing the state of each client system, customer information, and content (e.g., images) to be distributed. The server system may provide a packaging component to allow images to be packaged for distribution. The packaging component may customize the image packages to each client system. The customization may be based on the image plan and image update frequency of each client. For example, one client system may be subscribed to a modern art image plan to be updated monthly, and another client system may be subscribed to an outdoor photography image plan to be update weekly. A distribution component of the server system is responsible for distributing the image packages to the appropriate client system at the designated times. The server system may also provide configuration information to each client system to control the display of the images, communications with a server system, and so on. The distribution system may also provide a content web site 104 for access by customers of the distribution system. The content web site may allow a customer to subscribe to various plans, to upload images for distribution by the server system to the customer's client system, and so on.

The client systems and server system may include a central processing unit, memory, input devices (e.g., keyboard and pointing devices), output devices (e.g., display devices), and storage devices (e.g., disk drives). The memory and storage devices are computer-readable media that may contain instructions that implement the distribution system. In addition, the data structures and message structures may be stored or transmitted via a data transmission medium, such as a signal on a communications link. Various communications links may be used, such as the Internet, a local area network, a wide area network, or a point-to-point dial-up connection.

Figure 2:
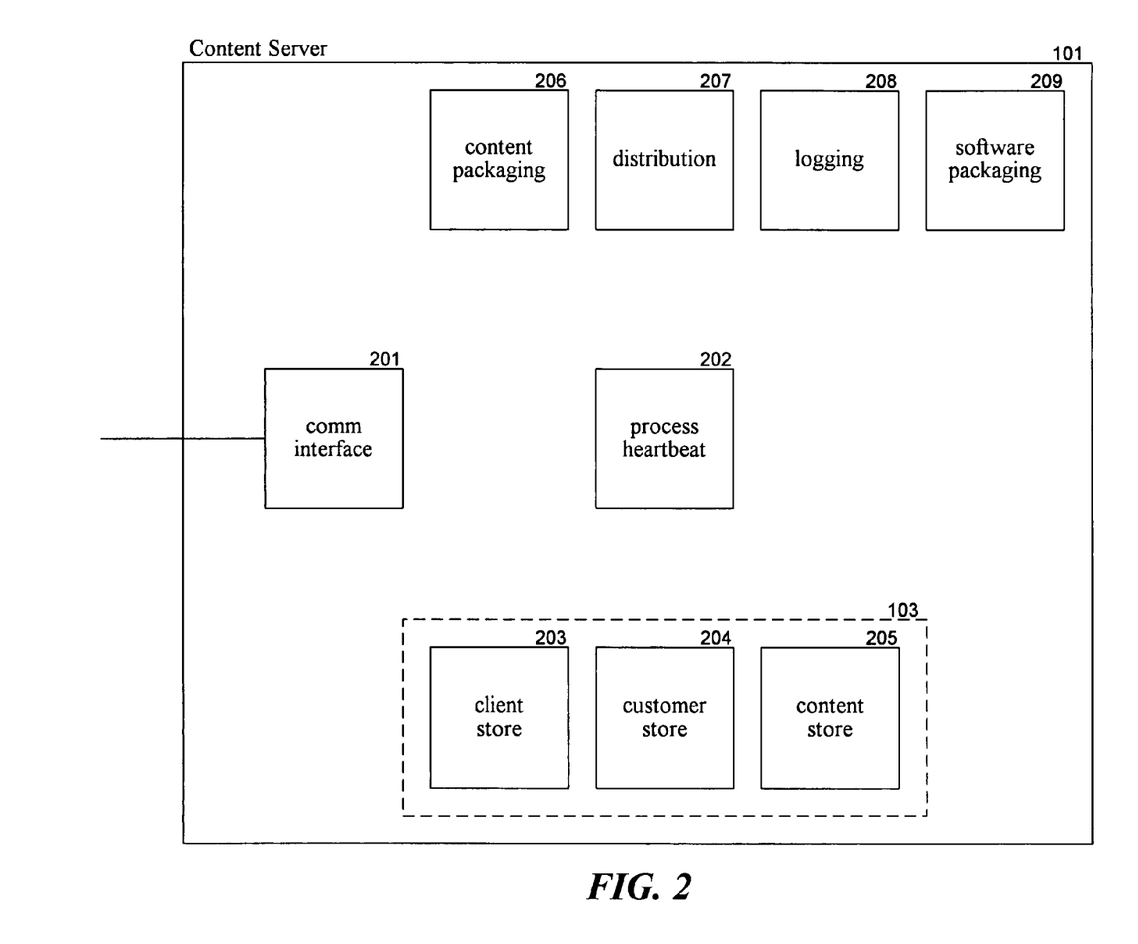
FIG. 2 is a block diagram illustrating components of the server system in one embodiment.

FIG. 2 is a block diagram illustrating components of the server system in one embodiment. The server system 101 includes a communication interface 201 through which all communications via the communications link 105 is routed. The process heartbeat component 202 receives heartbeat communications from the client systems and processes the communications as appropriate. The communications between the server system and client systems may be use an HTTP protocol via insecure port 80 or via secure port 443, or any other port. The client systems send heartbeat communications as an HTTP request periodically to the server system. The server system provides its instructions to the client systems via responses to the HTTP requests. Because the client systems initiate each communications, the server system can avoid firewall and other security problems that can occur if the server system initiated the communications. The server system includes an image packaging component 206, a distribution component 207, a logging component 208, and a software packaging component 209. The server system also includes a database 103 having a client store 203, a customer store 204, and an image store 205. The image packaging component is responsible for creating the image packages to be distributed to the client system. The image packaging component may use preference or subscription information stored in the customer store or client store in preparing the image packages using the image is contained in the image store. The software packaging component controls the packaging of software updates that are to be distributed to the client systems. The distribution component is responsible for distributing each image package to the appropriate client system at the appropriate time. The distribution component is also responsible for distributing software packages for updating the software of the client systems. The logging component is responsible for coordinating the retrieving of usage data from the client systems. In one embodiment, the server system only collects usage information from client systems that are connected to the server system via a communications link.

Figure 3:
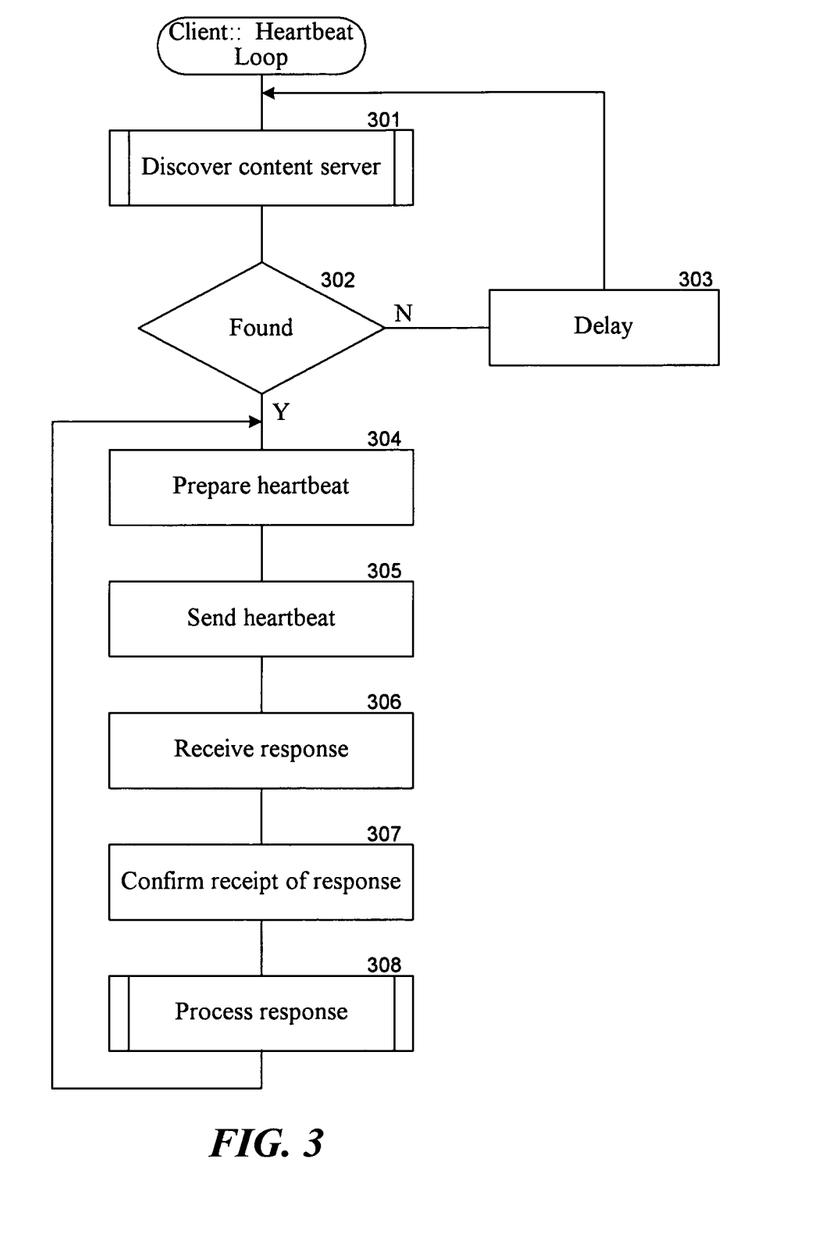
FIG. 3 is a flow diagram of an example heartbeat loop component of a client system in one embodiment.

FIG. 3 is a flow diagram of an example heartbeat loop component of a client system in one embodiment. The heartbeat loop periodically sends out heartbeat communications via an HTTP request to the server system so that the server system can send instructions via an HTTP response. In block 301, the component discovers the location of the server system. In decision block 302, if the server system was discovered, then the component continues that block 304, else the component continues at block 303. In block 303, the component delays for a specified time before retrying to discover the server system by looping to block 301. As described above, the client system can optionally be connected to the server system via a communications link. In blocks 304-308, the component loops sending heartbeat communications and processing the responses. In block 304, the component prepares a heartbeat communication. The heartbeat communication may contain the IP address of the client system, a unique client system identification, a programmatic client system identification provided by the server system, a current action, an operating status, and a time step. The programmatic identification may be a random number provided by the server system in the last communication with the client system as to help prevent spoofing of a client system. In block 305, the component sends the heartbeat communication to the server system. In block 306, the component receives the response to the heartbeat communication from the server system. In block 307, the component acknowledges receipt of the response by sending an HTTP request (i.e., another heartbeat communication) to the server system. The acknowledgment may indicate whether the response was correctly received, the response should be resent, or the client system is currently busy. In block 308, the component processes the response received in block 306. The component then loops to block 304 to prepare the next heartbeat communication.

Figure 4:
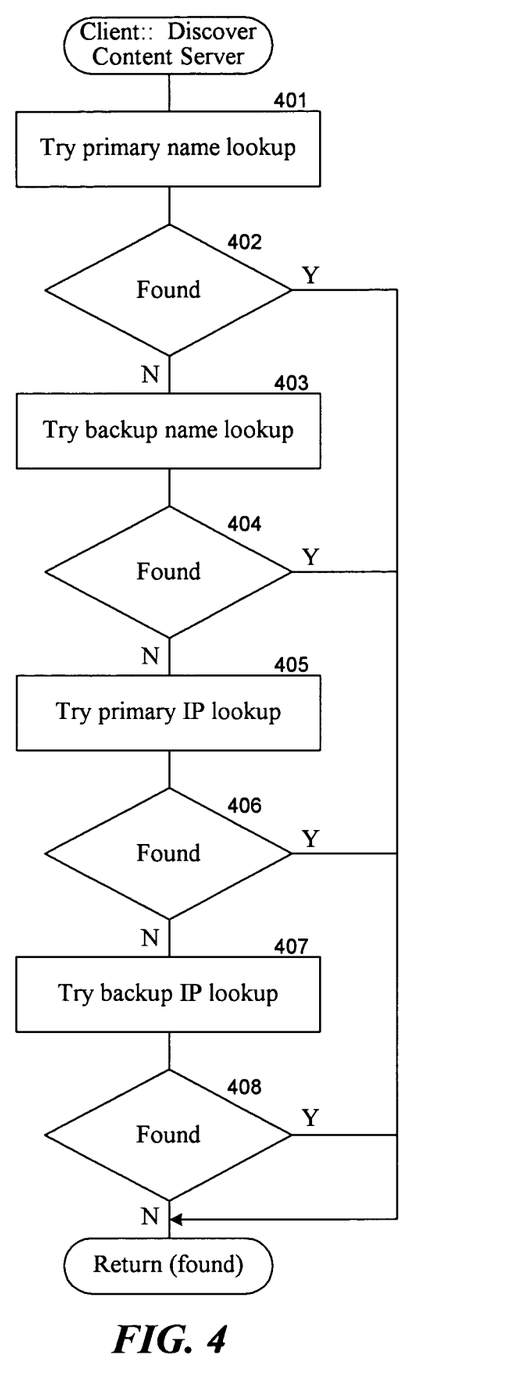
FIG. 4 is a flow diagram illustrating the processing of the discover component of a client system in one embodiment.

FIG. 4 is a flow diagram illustrating the processing of the discover component of a client system in one embodiment. In block 401, the component tries to connect to the server system using one more primary names (e.g., https://server.host1.net) associated with the server system. In decision block 402, if the connection is established, then the component returns, else the component continues at block 403. In block 403, the component tries to connect to the server system using one or more backup names (e.g., http://server.host2.net) associated with the server system. In decision block 404, if a connection is established, then the component returns, else the component continues at block 405. In block 405, the component tries to connect to the server system using one or more primary Internet protocol addresses. In decision block 406, if a connection is established, then the component returns, else the component continues at block 407. In block 407, the component tries to connect to the server system using one or more backup Internet protocol addresses. In decision block 408, if a connection is established, then the component returns an indication that a connection has been established, else the component returns an indication that a connection has not been established.

Figure 5:
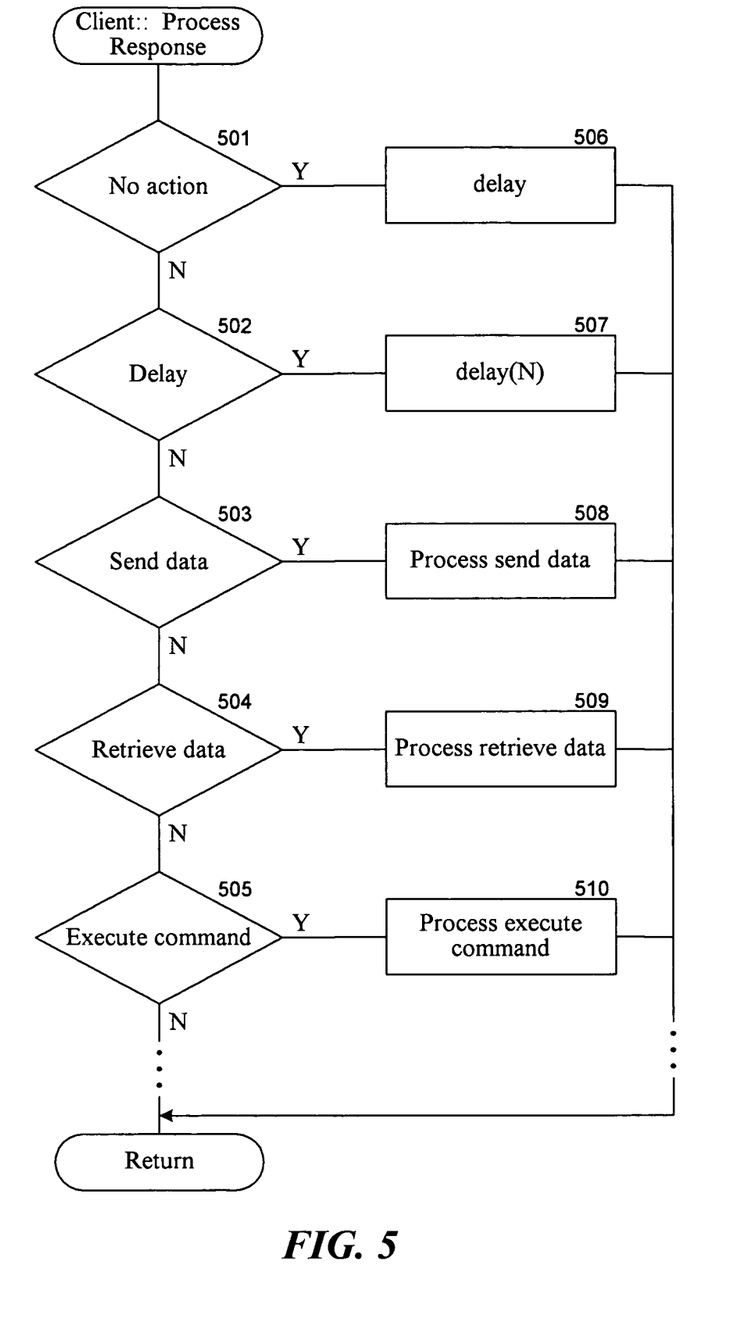
FIG. 5 is a flow diagram illustrating processing by a client system of a response in one embodiment.

FIG. 5 is a flow diagram illustrating processing by a client system of a response in one embodiment. In decision block 501, if the response indicates that no action is to be taken, then the component continues at block 506, else the component continues at block 502. In block 506, the component effects the delay between heartbeat communications and then returns to send the next heartbeat communication. In decision block 502, if the response indicates a designated delay amount, then the component continues at block 507, else the component continues at block 503. In block 507, the component delays the designated amount and then returns. The server system may provide a delay if, for example, the server system is will be unavailable for a certain period. In decision block 503, if the response indicates to send data, then the component continues at block 508 to process the send data instruction, else the component continues at block 504. The response may indicate to send usage data to the server system or to another designated system. In decision block 504, if the response indicates that the client system should retrieve data (e.g., an image package), then the component continues at block 509 to process the retrieve data instruction, else the component continues at block 505. In decision block 505, if the response indicates to execute a command, then the component continues at block 510 to process the execute command instruction, else the component continues processing the response as appropriate as indicated by the ellipses.

Figure 6:
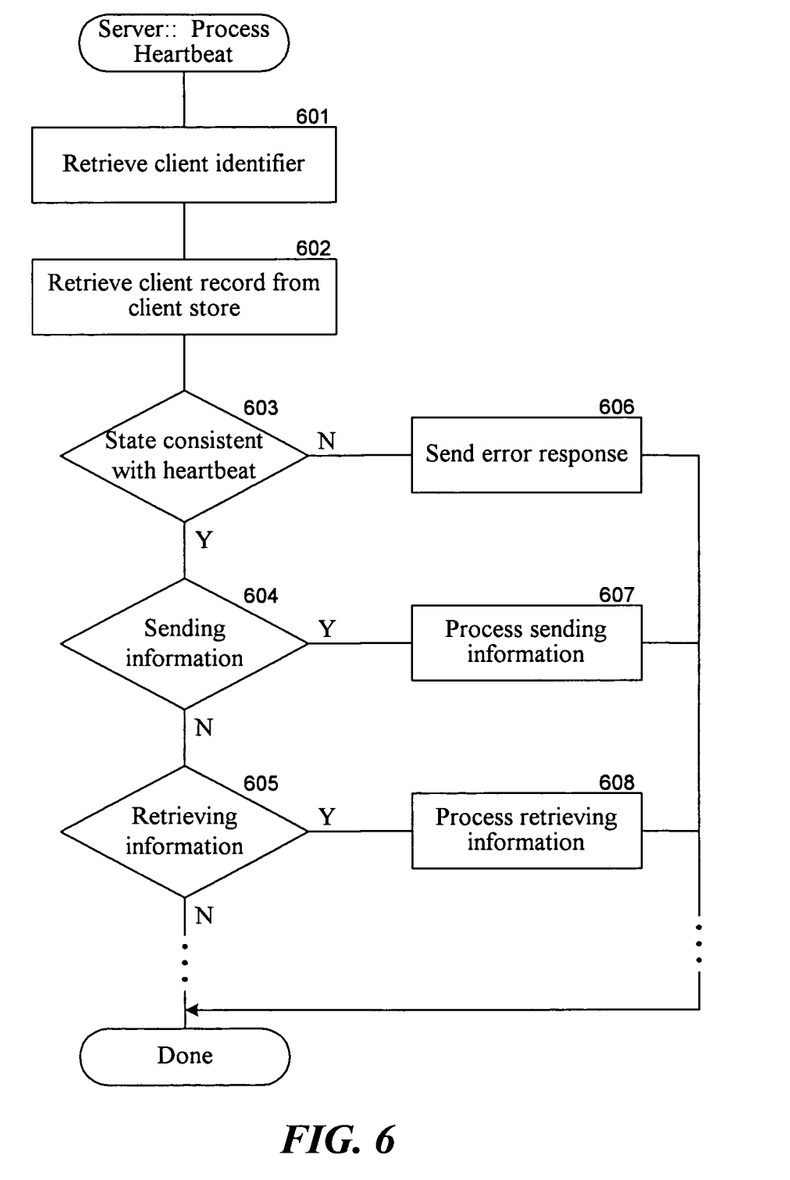
FIG. 6 is a flow diagram illustrating example processing of a server system when it receives a heartbeat communications from a client system.

FIG. 6 is a flow diagram illustrating example processing of a server system when it receives a heartbeat communications from a client system. In block 601, the component retrieves the client identifier from the heartbeat communication. In block 602, the component retrieves a client record from the client store and may retrieve a customer record from the customer store. In decision block 603, if the state of the client system is consistent with the heartbeat communications (e.g., the proper sequence within a session), then the component continues at block 604, else the component sends a response in block 606. In decision block 604, if the client system is in the process of sending information (e.g., usage data) to the server system, then the component continues at block 607 to process the information, else the component continues at block 605. In decision block 605, if the client system is in the process of retrieving information from the server system, then the component continues at block 608 to process the retrieved information, else the component continues at processing the communication as indicated by the ellipsis.

One skilled in the art will appreciate that although specific embodiments of the distribution system have been described herein for purposes of illustration, various modifications may be made without deviating from the spirit and scope of the invention. The distribution system may provide a variety of subscription plans, display options, and control options for the display of images. The subscription plans may allow a customer to subscribe to various channels or galleries (e.g., modern art) for each client system. A subscription plan may include a permanent set of images that is always included in the display list and a transient set of images that may change frequently. In one embodiment, the distribution system may allow a customer (e.g., via a web site) to specify that channels to be sent to a client system and to specify which images are to be permanently in the display list. The distribution system may also allow the user to upload images via the web site that are to then distributed to the designated client systems for display. For example, a business may upload pictures of a company picnic so they can be displayed. The distribution system may also allow for the displaying of brand information (e.g., a company logo) along with the images. The brand information may be uploaded via the web site for distribution to the client systems. A subscription plan may also allow for the displaying of credits (e.g., artist name) along with the images. A client system can display the credit information on a separate monitor, superimposed on the images, before and after a display of an image, and so on. The distribution system may also allow a customer to, using the web site, specify the scheduling for the display of images for a client system. A client system may allow the display of images to be interrupted to display information, such as a building directory or a news alert that may be identified using zip code information. Accordingly, the invention is not limited except by the appended claims.

We claim:

1. A distribution system for distributing images for display by client systems, the distribution system comprising:
   a server component comprising:
      an image store configured to store a plurality of images;
      a customer store configured to store information associated with customers of the distribution system, the information associated with a customer including an identification of a client system of the customer and criteria of the customer, the criteria including an image plan to which the customer is subscribed, the image plan specifying a subject matter attribute characterizing the subject matter of images that are to be distributed to the customer;

an image packaging component configured to periodically create a package of images for a client system of a customer based on the criteria associated with the customer, the package of images including at least one image stored in the image store; and a distribution component configured to send the package of images to the client system via a communications link on a periodic basis in response to receiving a heartbeat communication from the client system.

2. The distribution system of claim 1 including:
a customer interface component configured to receive information relating to the client system.

3. The distribution system of claim 2 wherein the customer interface component is a web-based interface.

4. The distribution system of claim 2 wherein the customer interface component is configured to update the customer store.

5. The distribution system of claim 2 wherein the criteria includes preferences of the customer related to images to be sent to the client system of the customer.

6. The distribution system of claim 1 wherein the communications link is the Internet.

7. The distribution system of claim 1 wherein the identification of the client system is a unique identifier.

8. The distribution system of claim 7 wherein the heartbeat communication received from the client system includes the unique identifier of the client system.

9. The distribution system of claim 1 wherein the server component further comprises a tracking component configured to receive usage information from client systems.

10. The distribution system of claim 1 wherein the server component further comprises a software update component configured to send software updates to client systems.

11. The distribution system of claim 1, further comprising:
a component configured to receive, from the customer via the client system, a request to subscribe to the image plan.

12. The distribution system of claim 1, wherein the distribution component is configured to send the package of images to the client system via a communications link on a periodic basis in response to receiving a heartbeat communication from the client system at least in part by,
in response to receiving the heartbeat communication from the client system,
determining whether a package of images is ready to be distributed to the client system,
if it is determined that a package of images is ready to be distributed to the client system, sending a response to the received heartbeat communication with an indication that a package of images is to be distributed, and
if it is determined that a package of images is not ready to be distributed to the client system, sending a response to the received heartbeat communication with an indication other than that a package of images is ready to be distributed.

13. The method of claim 12 wherein the response with an indication that a package of images is to be distributed includes the package of images.

14. The distribution system of claim 12, further comprising:
a component configured to, in response to determining that a package of images is not ready to be distributed to the at least one client system, send a response to the received heartbeat communication with an indication to retrieve a software update for the client system.

15. The distribution system of claim 12, further comprising:
a component configured to, in response to determining that a package of images is not ready to be distributed to the client system, send a response to the received heartbeat communication with an indication to send usage information to the distribution system.

16. The distribution system of claim 12, further comprising:
a component configured to control the rate at which the client system retrieves packages of images.

17. The distribution system of claim 12, further comprising:
a component configured to control the rate of sending responses with an indication that a package of images is ready to be distributed so that the rate at which the client system retrieves packages of images can be controlled.

18. The distribution system of claim 12 wherein the response with an indication that a package of images is to be distributed includes instructions for the client system to retrieve the package of images.

19. The distribution system of claim 12, further comprising:
a component configured to, in response to determining that a package of images is not ready to be distributed to the client system, send a response to the received heartbeat communication with an indication of when heartbeat communications are to be sent.

20. A method in a computer system of distributing images to client systems for display on a display device, the method comprising:
periodically generating by the computer system packages of images to be sent to client systems, a package of images including images selected in accordance with preferences associated with a client system to which the package is to be sent; and
sending a generated package of images to one or more client systems for display of the images at the client systems directly in response to receiving a heartbeat communication from the one or more client systems.

21. The method of claim 20 wherein the sending the generated package of images to the one or more client systems comprises:
sending the generated package of images to the one or more client systems on a periodic basis for display of the images at the client systems.

22. The method of claim 20 wherein the preferences associated with the client system include preferences of a customer associated with the client system related to images to be sent to the client system.

23. The method of claim 20, further comprising:
receiving usage information from the one or more client systems, the usage information associated with the display of the images at the client systems.

24. A computer system for distributing images to client systems for display on a display device, the system comprising:
means for periodically generating by the computer system packages of images to be sent to client systems, a package of images including images selected in accordance with preferences associated with a client system to which the package is to be sent; and
means including a communication device for sending, directly responsive to receiving a heartbeat communication from one or more client systems, a generated package of images to the one or more client systems for display of the images at the client systems.

25. The system of claim 24 wherein the means for sending the generated package of images to the one or more client systems comprises:
  means for sending the generated package of images to the one or more client systems on a periodic basis for display of the images at the client systems.

26. The system of claim 24 wherein the preferences associated with the client system include preferences of a customer associated with the client system related to images to be sent to the client system.

27. The system of claim 24, further comprising:
  means for receiving usage information from the one or more client systems, the usage information associated with the display of the images at the client systems.

28. The system of claim 24, further comprising:
  means for sending to the one or more client systems a command to be executed by the one or more client systems.

29. The system of claim 24, wherein the means for sending to the one or more client systems the command comprises:
  means for sending to the one or more client systems a command to be executed by the one or more client systems, the command specifying when the one or more client systems are to send heartbeat communications to the computer system.

30. The system of claim 24, further comprising:
  means for sending to the one or more client systems instructions for controlling the display of images at the client systems.

31. The system of claim 24, wherein the means for sending a generated package of images to the one or more client systems comprises:
  means for sending a generated package of images to the one or more client systems for display of the images at the client systems, the generated package of images being encrypted using a key that is unique to the client system to which the package is to be sent.

32. A method in a client computer system for communicating with an image distribution system, the method comprising:
  sending to the image distribution system a heartbeat communication;
  receiving from the image distribution system a response to the heartbeat communication, the response indicating whether a package of images is ready to be distributed to the client computer system;
  if the response indicates that a package of images is ready to be distributed to the client computer system, retrieving, by the client computer system, the package of images from the image distribution system; and
  if the response does not indicate that a package of images is ready to be distributed to the client system, performing, by the client computer system, an action specified by the response.

33. The method of claim 32 wherein the action indicates when heartbeat communications are to be sent.

34. The method of claim 32 wherein the action indicates to send usage information to the image distribution system.

35. The method of claim 32 wherein the response that indicates that a package of images is ready to be distributed includes the package of images.

36. An image distribution system comprising:
  means for preparing a package of images to be distributed to at least one client system;
  means for receiving at least one heartbeat communication from the at least one client system;
  means for sending a response to the received at least one heartbeat communication with an indication of whether a prepared package of images is ready to be distributed to the at least one client system; and
  means for sending a response to the received at least one heartbeat communication with an indication of an action to be performed by the at least one client system.

37. The system of claim 36 wherein the response with an indication of whether a package of images is ready to be distributed includes instructions for the at least one client system to retrieve the package of images.

38. The system of claim 37 wherein the instructions specify a location from where the package of images is to be retrieved and wherein at least one heartbeat communication is initiated by a client system.

39. The system of claim 36 wherein the action includes an indication to retrieve a software update for the at least one client system.

40. The system of claim 36, further comprising:
  means for throttling the rate at which packages of images are sent to the at least one client system.

* * * * *